US009289029B2

United States Patent
Miette

(10) Patent No.: US 9,289,029 B2
(45) Date of Patent: Mar. 22, 2016

(54) FOOTWEAR WITH IMPROVED SOLE ASSEMBLY

(75) Inventor: Philippe Miette, Annecy le Vieux (FR)

(73) Assignee: SALOMON S.A.S., Metz-Tessy (FR)

( * ) Notice: Subject to any disclaimer, the term of this patent is extended or adjusted under 35 U.S.C. 154(b) by 913 days.

(21) Appl. No.: 13/011,375

(22) Filed: Jan. 21, 2011

(65) Prior Publication Data

US 2011/0179680 A1 Jul. 28, 2011

(30) Foreign Application Priority Data

Jan. 25, 2010 (FR) ...................................... 10 00266

(51) Int. Cl.
| | | |
|---|---|---|
| A43B 13/00 | (2006.01) | |
| A43B 23/00 | (2006.01) | |
| A43B 5/00 | (2006.01) | |
| A43B 5/04 | (2006.01) | |
| A43B 13/14 | (2006.01) | |
| B29D 35/14 | (2010.01) | |
| A43B 13/12 | (2006.01) | |
| A43B 13/02 | (2006.01) | |

(52) U.S. Cl.
CPC ............. *A43B 13/141* (2013.01); *A43B 5/0411* (2013.01); *A43B 5/0421* (2013.01); *A43B 5/0482* (2013.01); *A43B 5/0492* (2013.01); *A43B 5/0496* (2013.01); *A43B 13/122* (2013.01); *B29D 35/142* (2013.01); *A43B 5/04* (2013.01); *A43B 13/02* (2013.01); *A43B 13/12* (2013.01)

(58) Field of Classification Search
CPC ...... A43B 13/02; A43B 13/12; A43B 13/122; A43B 5/04; A43B 5/0411

USPC ............ 36/30 R, 114, 115, 117.1, 117.3, 129, 36/132, 31, 117.2, 117.4, 117.5, 117.6, 36/107, 103; 280/611, 613, 615, 618

See application file for complete search history.

(56) References Cited

U.S. PATENT DOCUMENTS

| | | | | |
|---|---|---|---|---|
| 2,052,002 A | * | 8/1936 | Poole | 36/22 A |
| 3,807,062 A | | 4/1974 | Spier | |
| 4,186,500 A | | 2/1980 | Salzman | |
| 4,232,459 A | * | 11/1980 | Vaccari | 36/71 |
| 4,402,145 A | * | 9/1983 | Dassler | 36/32 R |
| 4,449,306 A | * | 5/1984 | Cavanagh | A43B 13/12 36/30 R |
| 4,559,724 A | * | 12/1985 | Norton | 36/129 |
| 4,741,114 A | * | 5/1988 | Stubblefield | 36/32 R |
| 4,945,658 A | * | 8/1990 | Provence | 36/117.2 |
| 5,077,916 A | * | 1/1992 | Beneteau | 361/114 |
| 5,367,791 A | * | 11/1994 | Gross et al. | 36/31 |
| 5,393,077 A | * | 2/1995 | Wanous | 280/7.13 |
| 5,899,006 A | * | 5/1999 | Donnadieu | A43B 5/049 12/146 B |
| 5,938,228 A | * | 8/1999 | Bourdeau | 280/607 |

(Continued)

*Primary Examiner* — Clinton T Ostrup
*Assistant Examiner* — Cameron A Carter
(74) *Attorney, Agent, or Firm* — Greenblum & Bernstein, P.L.C.

(57) ABSTRACT

An article of footwear including an outer sole assembly, the outer sole assembly extending lengthwise from a rear end to a front end, widthwise between a lateral side and a medial side, and heightwise between a free surface and a connection surface, the outer sole assembly including a core made of a first material. The core of the outer sole assembly includes a plate that demarcates the connection surface, as well as at least one boss that projects from the plate towards the free surface. The outer sole assembly includes an outer layer made of a second material, the outer layer at least partially demarcating the free surface, the outer layer at least partially covering the plate and at least partially covering a boss.

33 Claims, 4 Drawing Sheets

(56) References Cited

U.S. PATENT DOCUMENTS

| | | | |
|---|---|---|---|
| 6,000,148 A * | 12/1999 | Cretinon | 36/88 |
| 6,017,050 A * | 1/2000 | Girard | 280/615 |
| 6,289,610 B1 * | 9/2001 | Girard et al. | 36/117.2 |
| 6,655,050 B1 * | 12/2003 | Lowe | 36/93 |
| 6,733,031 B2 * | 5/2004 | Okajima et al. | 280/613 |
| 6,826,852 B2 * | 12/2004 | Fusco | 36/103 |
| 7,010,872 B2 * | 3/2006 | Pawlus et al. | 36/100 |
| D531,394 S * | 11/2006 | Bonnemere | D2/957 |
| 7,143,530 B2 * | 12/2006 | Hudson | A43B 1/0072 36/128 |
| 7,591,085 B2 * | 9/2009 | Haugltn | 36/117.3 |
| 7,827,705 B2 * | 11/2010 | Baucom et al. | 36/59 R |
| 7,882,648 B2 * | 2/2011 | Langvin | 36/59 R |
| 7,931,292 B2 * | 4/2011 | Miralles | 280/615 |
| 2001/0015024 A1 | 8/2001 | Girard et al. | |
| 2002/0092207 A1 * | 7/2002 | Girard et al. | 36/117.3 |
| 2007/0209230 A1 | 9/2007 | Dillon et al. | |
| 2007/0235984 A1 * | 10/2007 | Miralles | A43B 5/0413 280/615 |
| 2008/0272577 A1 * | 11/2008 | Kogler et al. | 280/615 |
| 2008/0289224 A1 * | 11/2008 | Sink | 36/103 |
| 2009/0293315 A1 * | 12/2009 | Auger et al. | 36/114 |

* cited by examiner

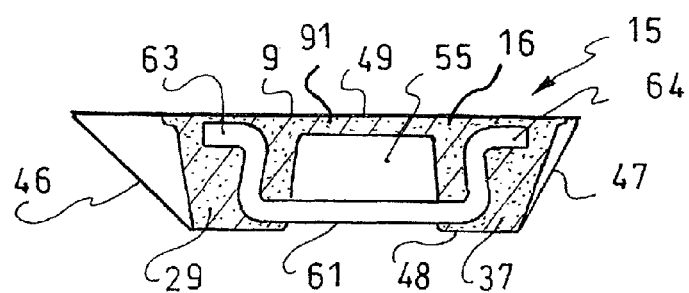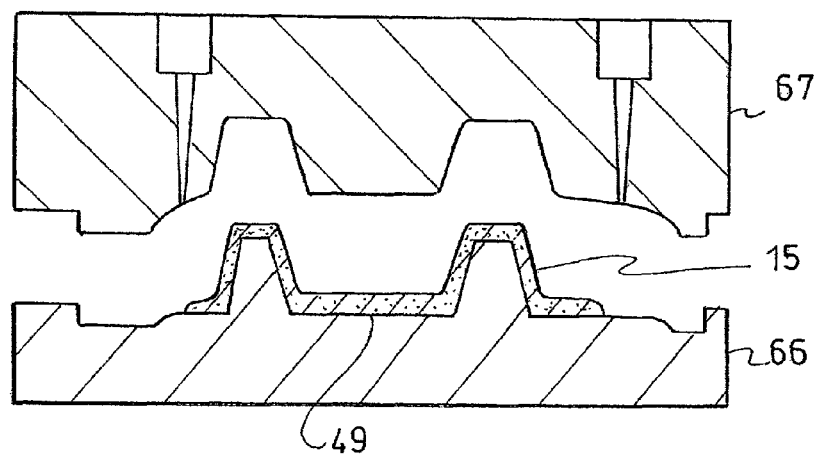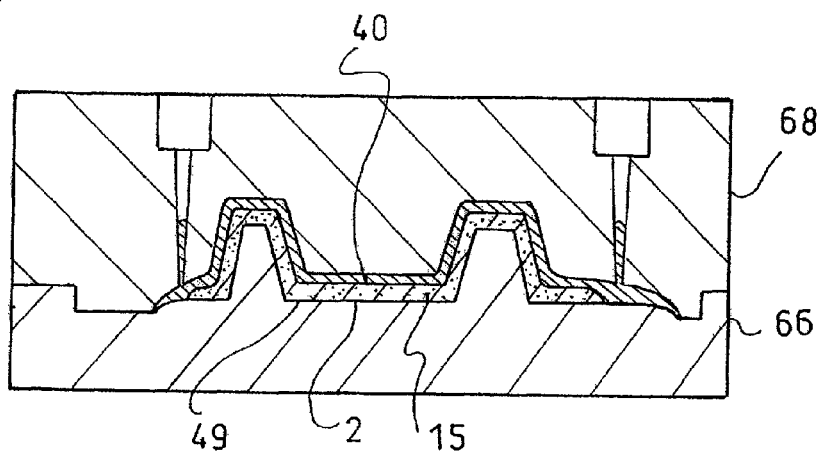

FOOTWEAR WITH IMPROVED SOLE ASSEMBLY

CROSS-REFERENCE TO RELATED APPLICATION

The instant application is based upon the French priority Patent Application No. 10.00266, filed Jan. 25, 2010, the disclosure of which is hereby incorporated by reference thereto, and the priority of which is hereby claimed under 35 U.S.C. §119.

BACKGROUND

1. Field of the Invention

The invention relates to an article of footwear, such as a shoe, in particular a sports shoe, and more particularly a shoe structured and arranged for skiing, race walking, or for other athletics.

2. Background Information

Footwear of the aforementioned type can be used in fields such as cross-country or telemark skiing, walking or running on flat or mountainous terrain, hiking, snowboarding, snowshoeing, skateboarding, cycling, ball-playing sports, and in other fields of endeavor.

An article of footwear, or a shoe, can have a low upper or a high upper and can be relatively flexible or, conversely, more rigid. In any case, the shoe is provided with an outer sole assembly, which is adapted to connect the upper to the ground or to a sport apparatus.

In a known manner, the outer sole assembly can be made out of a synthetic material, such as plastic, molded or shaped using any technique. The outer sole assembly is thus an element that extends lengthwise from a rear end to a front end, widthwise between a lateral side and a medial side, and heightwise between a free surface, adapted to contact the ground or the sports apparatus, and a connection surface, adapted to be affixed to the upper.

This element has the advantage of being easy to manufacture. However, the use of only one material does not make it possible to optimize the mechanical properties of each subdivision of the outer sole assembly. Indeed, various zones are subject to stresses of different types. For example, certain zones work in fatigue, such as those located at the limit between the toes and the metatarsus. This is where repeated flexing of the foot causes repeated flexing of the sole assembly. Other zones, for example, work in compression or friction, such as the heel zone, for example. Other zones still can absorb specific steering forces. This is particularly the case in cross-country skiing, where the outer sole assembly includes one or more connecting members, each provided for reversibly connecting the shoe to a retaining device, itself associated with the ski.

Still in a known manner, it has therefore been provided to use a plurality of synthetic materials to make an outer sole assembly, the underlying idea being to optimize the mechanical properties of at least certain subdivisions of the outer sole assembly.

For example, the main portion, or core, of the outer sole assembly is covered in the area of the heel and on the side of the free surface by one or more pieces of wear-resistant synthetic material.

Bands applied in the flexion zone, i.e., between the toes and the metatarsus, are also noted. The bands are made of a material different from that of the core.

Subdivisions made of different plastic materials, depending upon whether they include or do not include a member for connecting to a retaining device, such as a ski binding, are also noted.

Generally speaking, the known outer sole assemblies, made of a plurality of synthetic materials, still have certain disadvantages.

First, their mechanical properties are not optimized in all of their subdivisions. For technical shoes with a rigid sole assembly, it is noted, for example, that the edges of the sole assembly are not flexible enough and that, for this reason, they do not adequately assume the shape of the upper when the latter is being adhesively bonded to the sole assembly. This makes the adhesive bonding difficult. In addition, certain areas of the sole assembly that are more central are not sufficiently rigid to transmit the steering impulses with precision. Also, fatigue strength, related to the repeated flexing, is sometimes insufficient.

Next, it appears that the mechanical structure, when sufficiently strong, is also rather complex. This is particularly the case in cross-country skiing, where a member for connecting to the binding is affixed to the remainder of the sole assembly via several elements. This enables the member to be reliably affixed, while however increasing the structural complexity and the manufacturing costs.

Furthermore, it appears that incipient separation or fractures occur in the known sole assemblies, at the junction of the various materials. In other words, the known outer sole assemblies are sometimes fragile.

Moreover, the sole assemblies including a plurality of various materials are sometimes rather heavy.

SUMMARY

In view of the foregoing, the invention provides for an article of footwear that is particularly improved in the area of its outer sole assembly. More precisely, the invention optimizes the mechanical properties of the subdivisions of the outer sole assembly. The invention also provides for a simplified structure for the sole assembly. In addition, the invention increases the mechanical strength of the sole assembly and extends its lifespan. Further, the invention provides a sole assembly that is made lighter as much as possible, in particular in its outer portion. Still further, the invention improves the adhesive bonding of the sole assembly to the shoe upper.

In these regards, the invention provides an article of footwear that includes an outer sole assembly which extends lengthwise from a rear end to a front end, widthwise between a lateral side and a medial side, and heightwise between a free surface and a connection surface, the outer sole assembly including a core made of a first material.

The core of the outer sole assembly of the article of footwear according to the invention includes a plate that demarcates the connection surface, as well as at least one boss that projects from the plate towards the free surface, and the outer sole assembly includes a cover, or outer layer, made of a second material, the outer layer at least partially demarcating the free surface, the outer layer at least partially covering the plate and at least partially covering a boss.

In the invention, the core and the outer layer are respectively comprised of slightly different or even very different materials. This means that they have one or more different properties or characteristics, such as hardness or rigidity, for example.

Due to the precise covering of the bosses by the second material, the invention increases the affixation surface between the core and the cover, or outer layer, in comparison with the prior art, in which the affixation surfaces are planar, i.e., flat. It can be said that the contact surface between the core and the outer layer is essentially three-dimensional in the invention. This arrangement increases the mechanical strength that connects the core to the outer layer. Consequently, the forces at the borders between one another are reduced.

It is therefore advantageously possible to provide the core and the cover, or outer layer, with shapes that optimize the mechanical properties of the sole assembly in all of its subdivisions. Thus, the edges are selected to be flexible in order to better follow the contour of the upper. Central portions of the sole assembly are stiffer for transmitting the steering impulses. The portion between the toes and the metatarsus is dimensioned to resist bending fatigue. Advantageously, the core is made of a sufficiently strong material, from a mechanical point of view, for the anchoring of a connecting member.

Another advantage is the structural simplicity, in the sense that a connecting member, such as a member for connecting a cross-country or other boot to a ski, can be affixed directly to the remainder of the sole assembly.

Another advantage of the sole assembly according to the invention is increased strength, compared to a known sole assembly being subject to similar forces and having similar dimensions.

Also, the sole assembly of the invention is very lightweight, in relation to its dimensions and its mechanical strength.

Generally speaking, the invention, in particular due to a better compromise of its characteristics, improves the outer sole assembly of a shoe.

BRIEF DESCRIPTION OF DRAWINGS

Other characteristics and advantages of the invention will be better understood from the description that follows, with reference to the annexed drawings illustrating, by way of a non-limiting embodiment, how the invention can be embodied, and in which:

FIG. 3 is a cross section taken along the line III-III of FIG. 2;

FIG. 4 is a transverse cross section of a mold and taken along the line IV-IV of FIG. 2, for manufacturing the core of the sole assembly;

FIG. 5 is a transverse cross section of a mold, for affixing the cover of the sole assembly to the core;

DETAILED DESCRIPTION

The embodiment of the invention that is described hereinafter relates more particularly to articles of footwear, hereinafter occasionally referred to as a shoe, adapted for cross-country skiing, ski touring, or telemark skiing. However, the invention applies to other fields, such as those mentioned hereinabove. In addition, the article of footwear, hereafter referred to as a shoe, can have a high upper, as shown, or a low upper or even a mid-upper, the latter rising to approximately the level of the ankle of the wearer.

Figure 1:
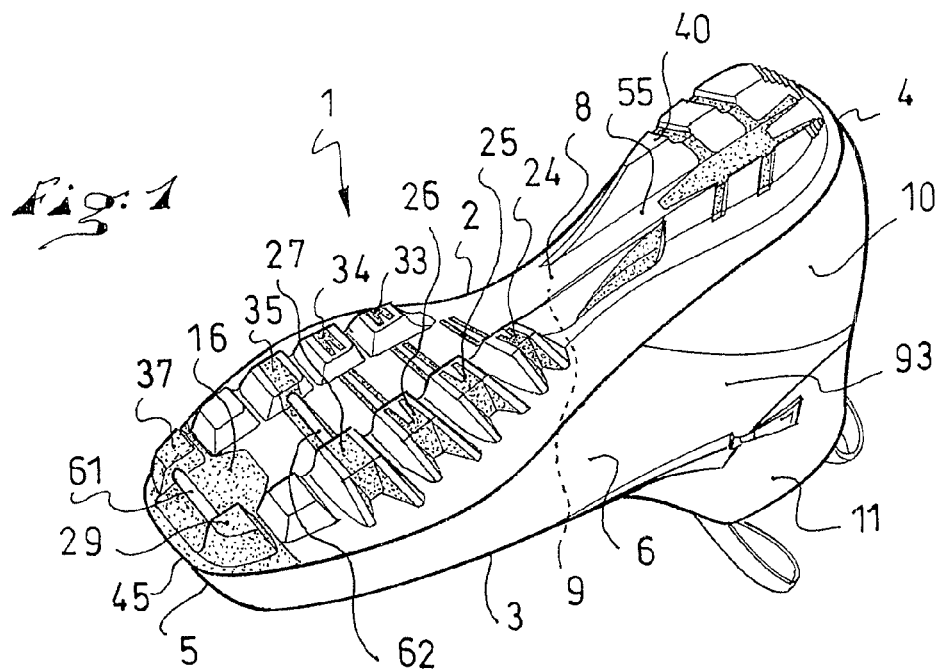
FIG. 1 is a perspective front view of an article of footwear, showing the sole, according to an exemplary embodiment of the invention.

The shoe 1, shown in FIG. 1, is adapted to receive the foot of the wearer.

In a known manner, the shoe 1 includes an outer sole assembly 2 and an upper 3. The shoe 1 extends lengthwise from a rear end or heel 4, to a front end or tip 5, and widthwise between a lateral side 6 and a medial side 7. The outer sole assembly 2 therefore extends lengthwise from the heel 4 to the tip 5, i.e., from the rear end to the front end, and widthwise between the lateral side 6 and the medial side 7. The sole assembly 2 also extends heightwise, or depthwise, between a free surface 8 and a connection surface 9. The free surface 8 is structured and arranged to contact the ground, to a device for binding the shoe to a sports apparatus (such as a ski), or to the apparatus itself. The connection surface 9 is used to affix the sole assembly 2 to the remainder of the shoe using an adhesive, for example.

As shown, the upper 3 includes a lower portion 10, adapted to surround the foot, as well as an upper portion 11, adapted to surround the ankle. However, the upper could be provided to include only the lower portion.

The sole assembly 2 includes a core 15, made of a first sufficiently hard material and illustrated in the drawing by means of groups of dots, or stippling. This provides the core with a grayish appearance, distinguishing it from the other elements in the drawing.

According to the invention, the core 15 of the outer sole assembly 2 includes a plate 16 that demarcates the connection surface 9, as well as at least one boss 21 to 37 projecting from the plate 16 towards the free surface 8. The outer sole assembly 2 of the shoe further includes a cover 40, or outer layer, made of a second, softer material, the outer layer at least partially demarcating the free surface 8, the outer layer 40 at least partially covering the plate 16 and at least partially covering a boss 21 to 37, or projection. In other words, the outer sole assembly 2 is in particular comprised of the association of the core 15 with the outer layer 40, which are made from materials described in more detail hereinafter. As further described below, the outer layer 40 is affixed to the core 15 by a means of adhesive bonding, welding, or any equivalent. Consequently, the association of the core 15 with the outer layer is three-dimensional, and permanent. This confers on each subdivision of the sole assembly 2 the mechanical properties that are adapted to the functions to be fulfilled. These aspects of the invention are further described below.

Figure 2:
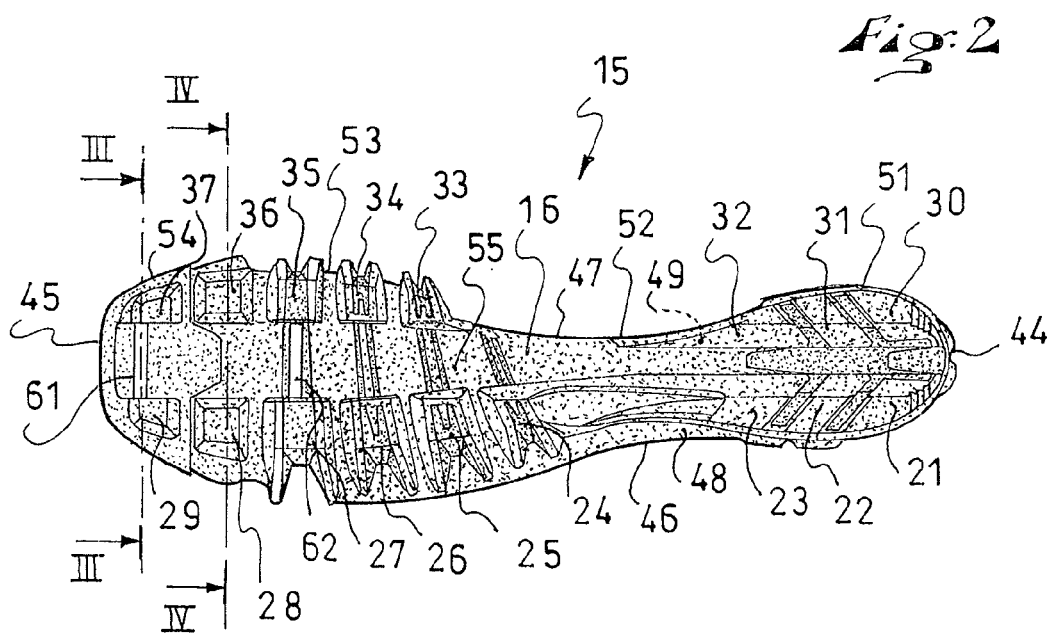
FIG. 2 shows a core of the outer sole assembly of the article of footwear of FIG. 1, shown on the side of the free surface of the sole assembly.
Figure 6:
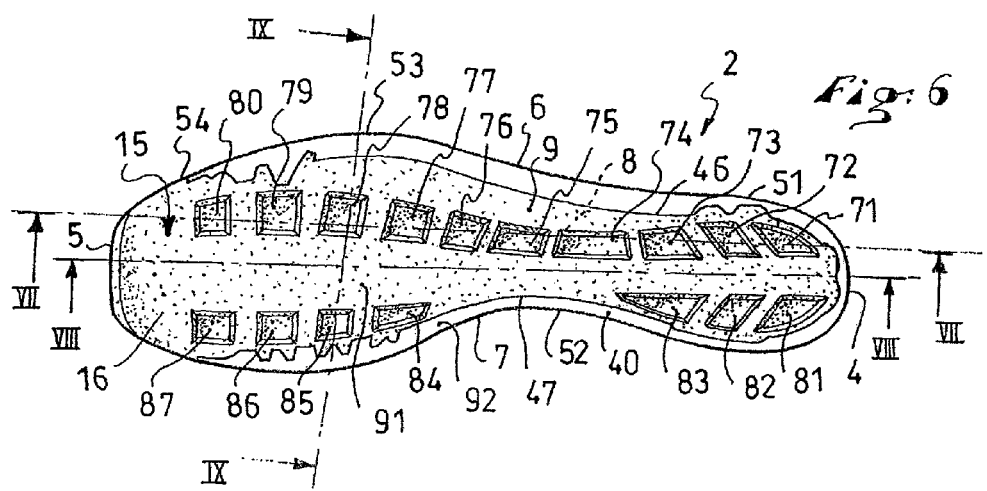
FIG. 6 is a view of the outer sole assembly, showing its surface for connecting to the remainder of the article of footwear.

As shown in FIG. 2, the core 15 extends lengthwise from a rear end 44 to a front end 45, widthwise between a lateral side 46 and a medial side 47, as well as heightwise between a lower surface 48 and an upper surface 49. As described further below, and illustrated in other figures, the lower surface 48 faces opposite the upper 3, whereas the upper surface 49 faces the upper 3. More precisely, the upper surface 49 of the core 15 here is a subdivision of the connection surface 9 of the sole assembly 2.

With reference to FIGS. 1 and 2, the rear end 4 of the shoe 1 and the rear end 44 of the core 15 are longitudinally offset with respect to one another. In practice, the end 4 extends rearward more than the end 44, i.e., the rear end 44 of the core is forwardly offset from the end 4 of the shoe. Conversely, the front end 5 of the shoe and the front end 45 of the core are the same or are substantially the same, i.e., they are at the same, or substantially the same, longitudinal position. Overall, the core 15 has a length ranging between 85 and 100% of the length of the sole assembly 2. A length ranging between 90 and 95% enables an optimized distribution of the mechanical properties of the sole assembly 2, as explained hereinafter.

Now, to explain the distribution of bosses 21 to 37, it is first noted that the sole assembly 2 has four successive zones. These include a rear zone 51, positioned in the area of the heel of the foot; a central zone 52, positioned in the area of the arch of the foot; a metatarsal zone 53, positioned in the area of the metatarsus; and a front zone 54, positioned in the area of the toes.

The bosses 21 to 37 of the exemplary illustrated embodiment include nine nearer the lateral side 46, and eight nearer the medial side 47, or, as an example, nine on the lateral side of a longitudinal median plane of the sole assembly and eight on the medial side of the longitudinal plane, although the division between the two groups can be divided differently according to the invention. That is, this quantity and this distribution, as shown, are not to be considered limiting to the invention. The rear zone 51 here includes three lateral bosses 21 to 23 and three medial bosses 30 to 32. The central zone 52 is flat, or substantially flat, and includes no bosses. The metatarsal zone 53 includes four lateral bosses 24 to 27 and three medial bosses 33 to 35. Finally, the front zone 54 includes two lateral bosses 28, 29 and two medial bosses 36, 37. Certain zones, as shown, include pairs of transversely spaced-apart bosses. The distribution of the bosses 21 to 37 demarcates a central longitudinal groove 55 of the sole assembly 2, as described further hereinafter. This groove is outwardly open in the area of the free surface 8 to cooperate with a guiding rib of the ski or of a binding device (not illustrated) for retaining the shoe 1 on the ski.

Further, as explained with reference to FIGS. 1 to 3, the sole assembly 2, and therefore the shoe 1, includes a first connecting member 61 and a second connecting member 62. As known to those skilled in the art, although not further described herein, each connection member 61, 62 is structured and arranged to be engaged by a binding, i.e., a retaining device, to secure the shoe to the ski or other sports apparatus. In this regard, U.S. Pat. No. 6,017,050, the disclosure of which is hereby incorporated by reference thereto in its entirety, discloses a binding having two such connecting members, the rear of the two being positioned in the metatarsal zone of the outer sole assembly and connecting to an elastic return mechanism for the shoe.

Because the members 61, 62 are identical, or at least similar, only one of them, namely the first member 61, is shown in FIG. 3. Each member 61, 62 has a generally omega shape. It can be comprised, for example, of a bent metal wire having a circular transverse cross section, with a diameter ranging between two and six millimeters. For example, a diameter of four millimeters is suitable. Each end 63, 64 of the member 61, 62 is embedded in a lateral boss 27, 29 or medial boss 35, 37, respectively, of the core 15. In fact, each connecting member 61, 62 is anchored in the core 15. That is, as shown in FIG. 3, each connecting member 61, 62, including each endmost surface thereof, is in direct contact with the first, and hardest, material of the core 15. Only an intermediate portion of the member, between the ends 63, 64, is not embedded. The anchoring in the hardest material of the core is sufficient and makes it possible to avoid the use of additional elements, such as enlarged heads, overmolded on the ends 63, 64. Each connecting member 61, 62 is parallel to the upper surface 49, or connection surface 9, and is oriented transversely in a direction extending from the lateral side 46 toward the medial side 47, of the core, i.e., also from the lateral side 6 toward the medial side 7 of the shoe. Of course, the shoe 1 may include only one member, such as the forwardmost connecting member.

A method for manufacturing the sole assembly 2 is now described with reference to FIGS. 4 and 5, in order to provide an increased understanding of the specific structural and functional attributes thereof.

An assembly including the core 15 and the connecting members 61, 62 is initially manufactured. To this end, with reference to FIG. 4, a first mold includes a frame 66 and a first cover 67. It is explained hereinafter that the frame 66, or base, is a common element shared by several molds. The members 61, 62 are positioned in the first mold, and then the constituent material of the core 15 is inserted into the mold by injection, for example. The assembly obtained is that of FIGS. 2 and 3. Then, the first cover 67 is replaced by a second cover 68 on the frame 66, as can be understood from FIG. 5, the core 15 and members 61, 62 remaining in position on the frame. The second cover 68 demarcates one or more spaces between the core 15 and itself 68. Then, the constituent material of the outer layer 40, or cover of the outer sole assembly 2, is inserted into the second mold, for example by injection, to partially follow the contours of the mold and partially assume the shape of the core 15. In other words, the outer layer 40 is molded in direct contact with the core 15. The sole assembly 2 as shown in FIGS. 6 to 9 is thus obtained.

Each of the elements, namely the core 15 and the outer layer 40, is made of a synthetic material, such as plastic. Thus, the core 15 and the outer layer 40 each include a material, or substance, such as polyamide, polyurethane, polyvinyl chloride, polyethylene, or the like.

According to the illustrated embodiment, the core 15 and the outer layer 40 are comprised of materials of the same type. This promotes their adherence to one another during manufacture. For example, if one includes polyurethane, then so does the other, the difference between the two elements 15, 40 being their respective level of hardness. The hardness of the core 15 is greater than that of the outer layer 40, because the hardness of the material of the core 15 is greater than that of the material of the outer layer 40. For example, the hardness of the core 15 ranges between 50 and 80 Shore D, whereas the hardness of the outer layer 40 ranges between 25 and 50 Shore D. Good results are obtained with values ranging from 50 to 60 Shore D for the core 15, and with values ranging from 30 to 40 Shore D for the outer layer 40.

The sole assembly 2 has open cavities 71 to 87, which open out on the side of the connection surface 9. There are ten cavities 71 to 87 toward the lateral side 46 of the core 15, and seven toward the medial side 47. This quantity and this distribution are not limiting for the invention. For example, the rear zone 51 has three lateral cavities 71 to 73 and three medial cavities 81 to 83. The central zone 52 has two lateral cavities 74, 75. The metatarsal zone 53 has four lateral cavities 76 to 79 and three medial cavities 84 to 86. Finally, the front zone 54 has a lateral cavity 80 and a medial cavity 87. The cavities lighten the sole assembly 2.

Most of the cavities 71 to 87 are arranged in bosses 21 to 37 and, therefore, such bosses can be characterized as hallow bosses. However, the two cavities 74, 75 of the central zone are in the area of a flat portion 90 of the free surface 8 of the sole assembly 2, i.e., these cavities do not extend into bosses. Conversely, the front lateral boss 29 and front medial boss 37 are solid bosses.

It can be said that the front bosses 29, 37 have good compressive strength, because they are integral with the core 15 which, as previously mentioned, is harder than the outer layer 40. The solid front bosses 29, 37 are exposed, i.e., not covered by the outer layer 40, thereby constituting solid ground-engaging tread blocks, including lowermost ground-engaging surfaces, made of the hard first material of the core. That is, the outer layer 40 does not extend forwardly as far as the position of the first connecting member 61. Thus, the transmission of forces and sensory information is precise at the front of the shoe 1, i.e., in the area of the first connecting member 61. Indeed, this connecting member is solidly anchored directly in the core 15. The aforementioned hollow bosses, whether having ground-engaging lower surfaces made of the second material covering such bosses (such as bosses 28, 36) or having exposed ground-engaging lower surfaces made of the first material (such as bosses 27, 35 and bosses 26, 34) constitute hollow ground-engaging tread blocks.

Similarly, the second connecting member 62 is also anchored in the core 15, in the area of the lateral boss 27 and medial boss 35. However, the outer layer 40 partially covers the bosses 27, 35, holding the second connecting member 62, to attenuate the intensity of the forces and impulses to and with the foot of the wearer. Given that the second member 62 is adapted to return the shoe towards the ski, as is known and not described further herein, the return motion is both precise and damped, thus providing steering comfort.

Figure 7:
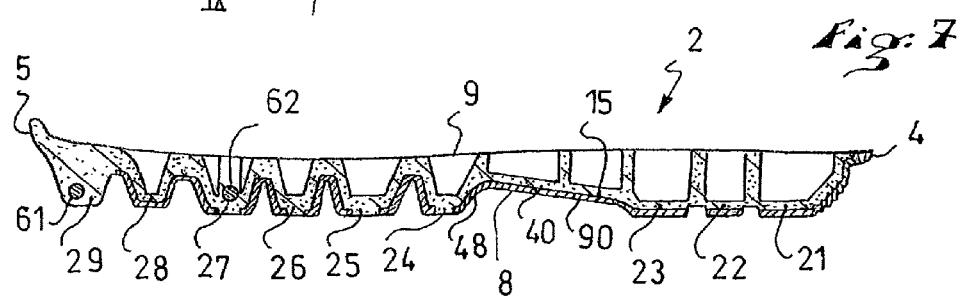
FIG. 7 is a cross section taken along the line VII-VII of FIG. 6.
Figure 8:
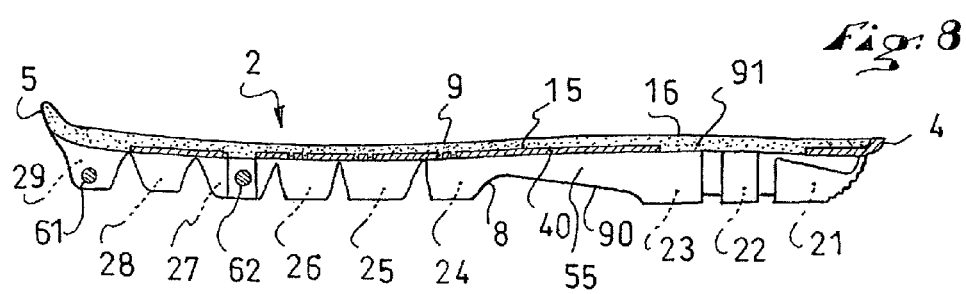
FIG. 8 is a cross section taken along the line VIII-VIII of FIG. 6.
Figure 9:
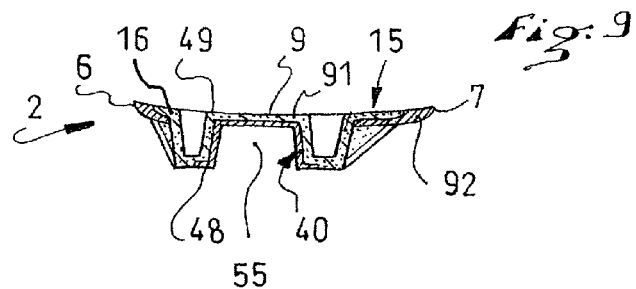
FIG. 9 is a cross section taken along the line IX-IX of FIG. 6.

The front bosses 28, 36 located between the connecting members 61, 62, are each recessed to demarcate a cavity 80, 87 which opens out on the side of the connection surface 9. The bosses 28, 36 are also completely covered, including the lowermost surface of each, by the outer layer 40, as shown in FIG. 7 but also in FIG. 1. This provides a mechanical tolerance for positioning the shoe 1 on a retaining device. Indeed, in this case, the members 61, 62 cooperate with the device. Softening the sole assembly 2 between the members 61, 62, in the area of the free surface 8, facilitates the positioning of the shoe on the device.

The rear bosses 21 to 23 and 30 to 32 of the rear zone 51 are completely covered by the outer layer 40. This enables damping of the support forces in the area of the heel.

The other bosses 24 to 26 and 33, 34 of the metatarsal zone 53 are partially covered by the outer layer 40. This provides a compromise between precision and damping.

Because the sole assembly 2 includes only two elements, namely the core 15 and the outer layer 40, made of a plastic material and different with respect to their respective levels of hardness, a wide range of subdivisions having various levels of rigidity can be obtained. In other words, combining the two materials multiplies the mechanical characteristics, some of which can still be specified.

As described previously, the longitudinal groove 55 extends between the lateral and medial bosses 21 to 37 and, therefore, also between the lateral and medial cavities 71 to 87. A longitudinal subdivision 91 of the plate 16 of the core 15 extends along the bottom of the groove 55 and, therefore, along the sole assembly 2. Following the example of the core 15, the longitudinal subdivision 91, or central band, has a length ranging between 85 and 100% of the length of the outer sole assembly 2. Because of its location, the band 91 demarcates a portion of the connection surface 9. This band is made of the hardest one of the materials. Thus, because the longitudinal subdivision 91 or band of hard material is continuous here, the transmission of longitudinal forces, by the sole assembly 2, is precise. It is, for example, a traction force exerted by the heel to lift the ski. The tractive force, or tension force, is transmitted directly to the connecting members 61, 62 by the band 91 inasmuch as the band extends continuously at least from the connecting members to the area of the heel of the outer sole assembly. Consequently, steering is more precise and performance improved.

Figure 10:
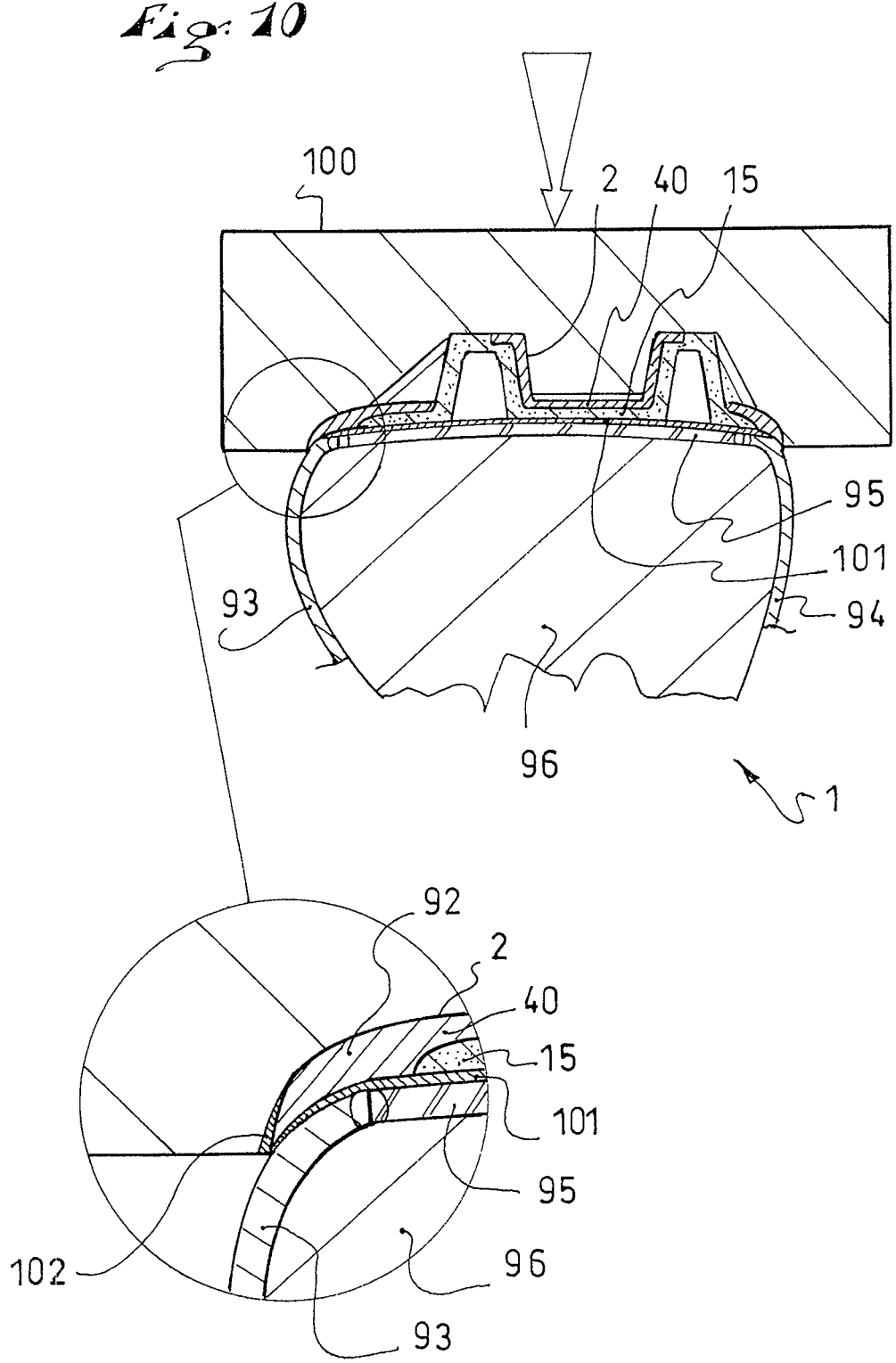
FIG. 10 shows the outer sole assembly being affixed to the remainder of the shoe.

Another advantageous characteristic of the outer sole assembly 2 relates to its periphery. As shown in particular in FIGS. 6 and 9, the outer layer 40 extends parallel to the plate 16 to widen the sole assembly 2 in the area of the lateral side 6 and in the area of the medial side 7, and to lengthen the sole assembly 2 in the area of the rear end 4. The widening and lengthening occur in a plane that contains the plate 16. It could be said that the outer layer 40 extends the core 15 in the area of its lateral edge 46, medial edge 47, and rear end 44. Consequently, the outer sole assembly 2 has a flexible peripheral lip 92, which extends along the lateral side 6, the rear end 4, and the medial side 7 and beyond such respective peripheries of the core 15. The lip is a subdivision of the outer layer 40. The lip 92 is a continuous subdivision of the sole assembly 2, but it could alternatively be divided up. The lip extends over a length ranging between 70 and 100% of the periphery of the sole assembly 2. Because of its flexibility, the lip 92 of the sole assembly 2 improves the application of the sole assembly 2 on the remainder of the shoe, as can be understood from FIG. 10.

Next described is a final manufacturing phase. The shoe 1 which, in this case, includes a lateral quarter 93, a medial quarter 94, and an insole 95, is nested on a blank 96. The outer sole assembly 2 is applied to the blank 96, by means of a tool 100, to cover the insole 95 and the adjacent portions of the lateral quarter 93 and medial quarter 94. A layer of adhesive 101 is arranged between the outer sole assembly 2 and the remainder of the shoe 1. The flexibility of the outer layer 40 and, consequently, the flexibility of the lip 92, enables the outer sole assembly 2 to closely follow the curvatures of the insole 95 and of the quarters 93, 94. Thus the sole assembly 2 adheres to the remainder of the shoe 1 more efficiently. The latter is more solid. It is noted that a flexible joint 102 is positioned in the tool 100 to press on the lip 92. The flexibility of the joint 102 enables the tool 100 to function in spite of the manufacturing tolerances.

In any case, the invention is embodied from materials and according to implementation techniques known to one of ordinary skill in the art.

The invention is not limited to the particular embodiment described hereinabove and illustrated in the drawing, and includes all of the technical equivalents that fall within the scope of the claims that follow.

In particular, a number of alternative structures can be provided for the bosses or the cavities.

The constituent materials of the core 15 and outer layer 40 can be of different types. This means that their chemical formulations are different. The materials can be selected so that one adheres to the other during molding.

One could provide to use three or more materials to make the outer sole assembly.

One can also provide for the core 15 and, consequently, the longitudinal subdivision 91 to be split up.

In addition, the invention illustratively disclosed herein suitably may be practiced in the absence of any element which is not specifically disclosed herein.

The invention claimed is:

1. An article of footwear comprising: an outer sole assembly having a rear end and a front end, defining a length; a lateral side and a medial side, defining a width; and a ground-contacting free surface and a connection surface, defining a height, the connection surface designed to connect the outer sole assembly to a remainder of the article of footwear; the outer sole assembly including a core, the core being made of a first material; the first material of the core of the outer sole assembly comprising: a plate demarcating the connection surface; at least one boss projecting from the plate toward the free surface; the outer sole assembly further comprising an outer layer made of a second material, the first material having a hardness greater than a hardness of the second material; the outer layer at least partially demarcating the free surface of the outer sole assembly; the outer layer at least partially covering and directly contacting the plate and at least partially covering and contacting at least one of said at least one boss; the outer layer further comprising a peripheral lip extending along and beyond respective peripheries of a lateral side, a rear end, and a medial side of the core of the outer sole assembly; the peripheral lip being a flexible lip made of the second material.

2. An article of footwear according to claim 1, wherein:
the first material of the core having a length ranging between 85 and 100% of the length of the sole assembly.

3. An article of footwear according to claim 1, wherein:
said at least one boss comprises nine bosses on a lateral side of the core, and eight bosses on a medial side of the core.

4. An article of footwear according to claim 1, wherein:
said at least one boss comprises rear bosses in a heel area of the outer sole assembly, the rear bosses being completely covered by the outer layer.

5. An article of footwear according to claim 1, wherein:
said at least one boss comprises a plurality of bosses of a metatarsal zone of the outer sole assembly partially covered by the outer layer.

6. An article of footwear according to claim 1, further comprising:
open cavities that open out on the connection surface of the outer sole assembly.

7. An article of footwear according to claim 1, wherein:
said at least one boss comprises a plurality of bosses distributed in a way to demarcate a longitudinal groove of the sole assembly, said groove opening out in a direction toward the free surface.

8. An article of footwear according to claim 7, wherein:
the plate comprises a longitudinal band extending along the sole assembly and demarcating a bottom of the longitudinal groove, the band having a length ranging between 85 and 100% of the length of the sole assembly, the band being made of the first material of the core.

9. An article of footwear according to claim 1, further comprising:
an upper having a lower surface affixed to the connection surface of the outer sole assembly;
the lower surface of the upper extending beyond the respective peripheries of the lateral side, the rear end, and the medial side of the core of the outer sole assembly and extending vertically over and being adhesively secured to the peripheral lip.

10. An article of footwear according to claim 1, wherein:
the at least one boss comprises at least a pair of transversely spaced-apart bosses projecting from the plate toward the free surface;
the outer sole assembly further comprises a first connecting member structured and arranged to be engaged by a binding for securing the article of footwear to a sports apparatus.

11. An article of footwear according to claim 10, wherein:
the first connecting member is positioned forward of a metatarsal zone of the outer sole assembly.

12. An article of footwear according to claim 10, further comprising:
a second connecting member positioned in the metatarsal zone of the outer sole assembly.

13. An article of footwear according to claim 10, further comprising:
a central longitudinal groove designed for cooperation with a guiding rib of the binding, said groove opening out in the free surface of the outer sole assembly;
the at least one boss of the core comprising at least one transversely spaced-apart pair of bosses, the first connecting member being anchored in the first material of the core and spanning the longitudinal groove;
first material being the hardest substance of the core.

14. An article of footwear according to claim 1, wherein:
a hardest material of the core having a length between 85 and 100% of the length of the sole assembly.

15. An article of footwear according to claim 1, wherein:
the first material of the core has a hardness between 50 and 80 Shore D.

16. An article of footwear comprising:
an outer sole assembly having a rear end and a front end, defining a length;
a lateral side and a medial side, defining a width; and a ground-contacting free surface and a connection surface, defining a height, the connection surface designed to connect the outer sole assembly to a remainder of the article of footwear;
the outer sole assembly comprising a core, the core being made of a first substance;
the first substance of the core of the outer sole assembly comprising:
a plate demarcating the connection surface;
at least first and second pairs of transversely spaced-apart bosses projecting from the plate toward the free surface, the first pair of spaced-apart bosses being forward of the second pair of spaced-apart bosses;
the outer sole assembly further including an outer layer made of a second substance having a lesser hardness than a hardness of the first substance of the outer layer;
the outer layer at least partially demarcating the free surface;
the outer layer having been adhesively affixed to or molded onto the plate and at least partially covering the plate and at least partially covering the second pair of spaced-apart bosses;
a first connecting member structured and arranged to be engaged by a binding, the first connecting member anchored in the core and extending between the first pair of spaced-apart bosses;
the first connecting member being at a position forward of a metatarsal zone of the outer sole assembly.

17. An article of footwear according to claim 16, further comprising:
a second connecting member positioned in the metatarsal zone of the outer sole assembly and extending between the second pair of spaced-apart bosses.

18. An article of footwear according to claim 17, wherein:
the first pair of spaced-apart bosses are not completely covered by the outer layer;
the second pair of spaced-apart bosses are completely covered by the outer layer.

19. An article of footwear according to claim 16, wherein:
the outer layer of the outer sole assembly does not extend forwardly as far as the position of the first connecting member.

20. An article of footwear according to claim 19, wherein:
the outer layer of the sole assembly does not extend forwardly as far as the first pair of spaced-apart bosses so that the first pair of spaced-apart bosses comprise a first pair of ground-engaging tread blocks having surfaces of the first substance.

21. An article of footwear according to claim 20, wherein:
the first pair of ground-engaging tread blocks are solid and have no cavities opening up to the connection surface;
the second pair of spaced-apart bosses include respective cavities opening up to the connection surface;
the second pair of spaced-apart bosses are at least partially covered by the second substance and comprise a second pair of ground-engaging tread blocks.

22. An article of footwear according to claim 21, wherein:
the first pair of ground-engaging tread blocks have lowermost ground-engaging surfaces of the first substance.

23. An article of footwear according to claim 21, wherein:
the second pair of ground-engaging tread blocks have lowermost ground-engaging surfaces of the second substance.

24. An article of footwear according to claim 16, wherein:
the first substance of the core has a hardness between 50 and 80 Shore D.

25. An article of footwear according to claim 16, wherein:
the first substance is the hardest substance of the core.

26. An article of footwear comprising: an outer sole assembly having a rear end and a front end, defining a length; a lateral side and a medial side, defining a width; and a ground-contacting free surface and a connection surface, defining a height, the connection surface designed to connect the outer sole assembly to a remainder of the article of footwear; the outer sole assembly including a core, the core being made of a first material; the first material of the core of the outer sole assembly comprising: a plate demarcating the connection surface; at least a pair of spaced-apart bosses projecting from the plate toward the free surface; the outer sole assembly further comprising an outer layer made of a second material, the first material having a greater hardness than a hardness of the second material; the outer layer at least partially demarcating the free surface; the outer layer at least partially covering and directly contacting the plate and at least partially covering at least one pair of said at least one boss a pair of spaced-apart bosses; a connecting member structured and arranged to be engaged by a binding for binding the article of footwear to a sports apparatus, the connecting member being anchored in the core and extending across a longitudinal median plane of the outer sole assembly at or forward of a metatarsal zone of the outer sole assembly; the plate of the core of the outer sole assembly comprising a longitudinally extending band having a width demarcated at least in part by the spaced-apart bosses, the band being made of a material having a hardness greater than a hardness of the second material; the band extending longitudinally continuously at least from an area of the connecting member to a heel area of the outer sole assembly.

27. An article of footwear according to claim 26, wherein:
the outer layer of the outer sole assembly does not extend forwardly as far as the connecting member.

28. An article of footwear according to claim 26, wherein:
the outer layer further comprises a peripheral lip extending along and beyond respective peripheries of a lateral side, a rear end, and a medial side of the core of the outer sole assembly;
the lip is made of the second material.

29. An article of footwear according to claim 26, wherein:
the at least a pair of spaced-apart bosses comprises a plurality of pairs of spaced-apart bosses demarcating a longitudinal groove of the sole assembly, the longitudinal groove opening out in a direction toward the free surface.

30. An article of footwear according to claim 26, wherein:
the first material of the core has a hardness between 50 and 80 Shore D.

31. An article of footwear comprising: an outer sole assembly having a rear end and a front end, defining a length; a lateral side and a medial side, defining a width; and an upper surface and a lower surface, defining a height; a plurality of successive zones extending along the length of the outer sole assembly, said zones comprising a rear zone, a central zone, a metatarsal zone, and a toe zone; a remainder of the article of footwear comprising an upper; the lower surface of the outer sole assembly comprising a free surface designed to be ground-engaging during use of the article of footwear; the outer sole assembly further comprising: a core having a lateral side and a medial side, as well as a front end and a rear end; and an outer layer covering and at least directly contacting at least portions of the core and at least partially demarcating the ground-engaging free surface of the outer sole assembly; the core having an upper surface and a lower surface; the lower surface of the core at least partially demarcating the ground-engaging free surface of the outer sole assembly; the upper surface of the core, transversely from the lateral side of the core to the medial side of the core, comprising a connection surface of the outer sole assembly designed to connect the outer sole assembly to the remainder of the article of footwear; the core extending within the toe zone of the outer sole assembly and rearward of the toe zone and having a length between 85% and 100% of the length of the outer sole assembly; the core further comprising: a plate having an upper surface and a lower surface, the upper surface of the plate demarcating the connection surface of the outer sole assembly; a plurality of transversely extending pairs of bosses projecting from the lower surface of the plate toward the free surface of the outer sole assembly, at least one of the pairs of bosses being hollow bosses having cavities that open in the connection surface of the core, each of said pairs of bosses comprising at least a part of respective pairs of tread blocks, each of the tread blocks have a ground-engaging lowermost surface, each ground-engaging lowermost surface comprising a part of the free surface of the outer sole assembly; the outer layer being softer than the core in the portions of the core covered by the outer layer.

32. An article of footwear according to claim 31, wherein:
one of the pairs of bosses is a forwardmost pair of bosses within the toe zone of the outer sole assembly, each of the forwardmost pair of bosses having a lower surface comprising a respective part of the free surface of the outer sole assembly;
the outer layer not covering the lowermost surfaces of the forwardmost pair of bosses.

33. An article of footwear according to claim 32, wherein:
the forwardmost pair of bosses are solid bosses and have no cavities opening in the connection surface of the core.

* * * * *